Aug. 18, 1970     E. S. KRATZKE     3,524,514
OSCILLATING TANDEM HITCH

Filed April 29, 1968     3 Sheets-Sheet 1

INVENTOR.
EARL S. KRATZKE
BY
Williamson, Palmatier & Bains

INVENTOR.
EARL S. KRATZKE

Aug. 18, 1970  E. S. KRATZKE  3,524,514
OSCILLATING TANDEM HITCH
Filed April 29, 1968  3 Sheets-Sheet 3

INVENTOR.
EARL S. KRATZKE
BY
Williamson, Palmatier & Bains

United States Patent Office 3,524,514
Patented Aug. 18, 1970

3,524,514
OSCILLATING TANDEM HITCH
Earl S. Kratzke, Cologne, Minn. 55322
Filed Apr. 29, 1968, Ser. No. 724,766
Int. Cl. B62d 5/06
U.S. Cl. 180—79.2      4 Claims

ABSTRACT OF THE DISCLOSURE

A hitch mechanism for coupling two vehicles in tandem, such as two farm tractors, is comprised of two coupling members, one of which is rigidly secured to the rear of one of the vehicles and the other of which is pivotally fastened to the front end of the other vehicle for swinging movement in a vertical plane. The vertically swingable coupling member is conveniently secured to the front axle of the rear vehicle for pivotal movement therewith. A horizontal shaft extending from the rear coupling member is shiftably received in an arcuate slot formed in a rigid plate attached to the front of the rear vehicle, and as the two vehicles oscillate vertically with respect to each other about the horizontal axis extending through the rear coupling member pivot point, the arcuate slot supportably engages the swinging coupling shaft. The two coupling members are releasably fastened together for relative, horizontal steering movement about a vertical kingpin extending through aligned holes therein. A pair of supplemental, hydraulic turning cylinders extending between the front of the rear vehicle frame and the front coupling member and actuated by the hydraulic steering mechanism of the rear vehicle serve to turn the front vehicle horizontally about the vertical kingpin.

BACKGROUND OF THE INVENTION

In the course of farming operations, it is frequently necessary and desirable to utilize particularly large and heavy pieces of ground-working machinery. For such occasions, a farmer must either keep a relatively large horsepower tractor on hand, or he must find some means of satisfactorily coupling together two tractors in a tandem arrangement so as to use their combined power for pulling the heavy machinery. Hitch mechanisms for coupling two tractors together in such a tandem arrangement have not been satisfactory in the past for the reason that they do not properly provide for relative oscillating movement between the frames of the two tractors as their separate wheels traverse uneven ground. If the hitch mechanism and the interconnected parts of the frames of the two vehicles do not provide proper mutual support as the two frames oscillate relative to one another around a horizontal axis, undue stress and premature fatigue failure will be imposed upon the hitch structure.

There is no known coupling device which is readily available as a package and which is particularly suited for joining two power-driven tractors together in such a way that their frames will be properly supported as they articulate with respect to each other about both vertical and horizontal axes.

BRIEF SUMMARY OF THE INVENTION

This invention has as its primary objective the provision of a tandem hitch so designed as to permit proper articulating movement between the frames of two vehicles which it couples together in end-to-end alignment. This basic goal is realized by means of a hitch mechanism comprised of two coupling members releasably secured together by means of a vertical turning pin, one of the coupling members being rigidly secured to one vehicle end and the other coupling member being pivotally attached to the adjacent end of the other vehicle for swinging movement about a horizontal axis.

The vertical, swinging movement of the one coupling member is conveniently provided for by connecting the swingable coupling member to the vertically, pivotal front axle of the rear vehicle. The central, pivot pin conventionally provided for the front axle of the rear vehicle is thus utilized to provide relative pivotal movement between the frames of the two vehicles. In order to insure the essential articulating movement between the two vehicle frames, the wheels are removed from the rear vehicle's front axle so that it can pivot freely.

A particularly advantageous feature of my invention resides in the use of a slot and shifting shaft arrangement to properly support the oscillating coupling member and the front vehicle frame. The oscillating coupling member carries a horizontally extending shaft which rides back and forth in an arcuate slot formed in a rigid plate firmly fastened to the front end of the rear vehicle.

As a further beneficial feature of my improved tandem hitch I employ the existing power steering system on one of the tractors to actuate supplemental hydraulic turning cylinders connected between the front end of the frame of the rear vehicle and the rigid coupling member secured to the rear of the front vehicle.

These and other objects and advantages of my invention will become readily apparent as the following description is read in conjunction with the accompanying drawings, of which:

Figure 1:
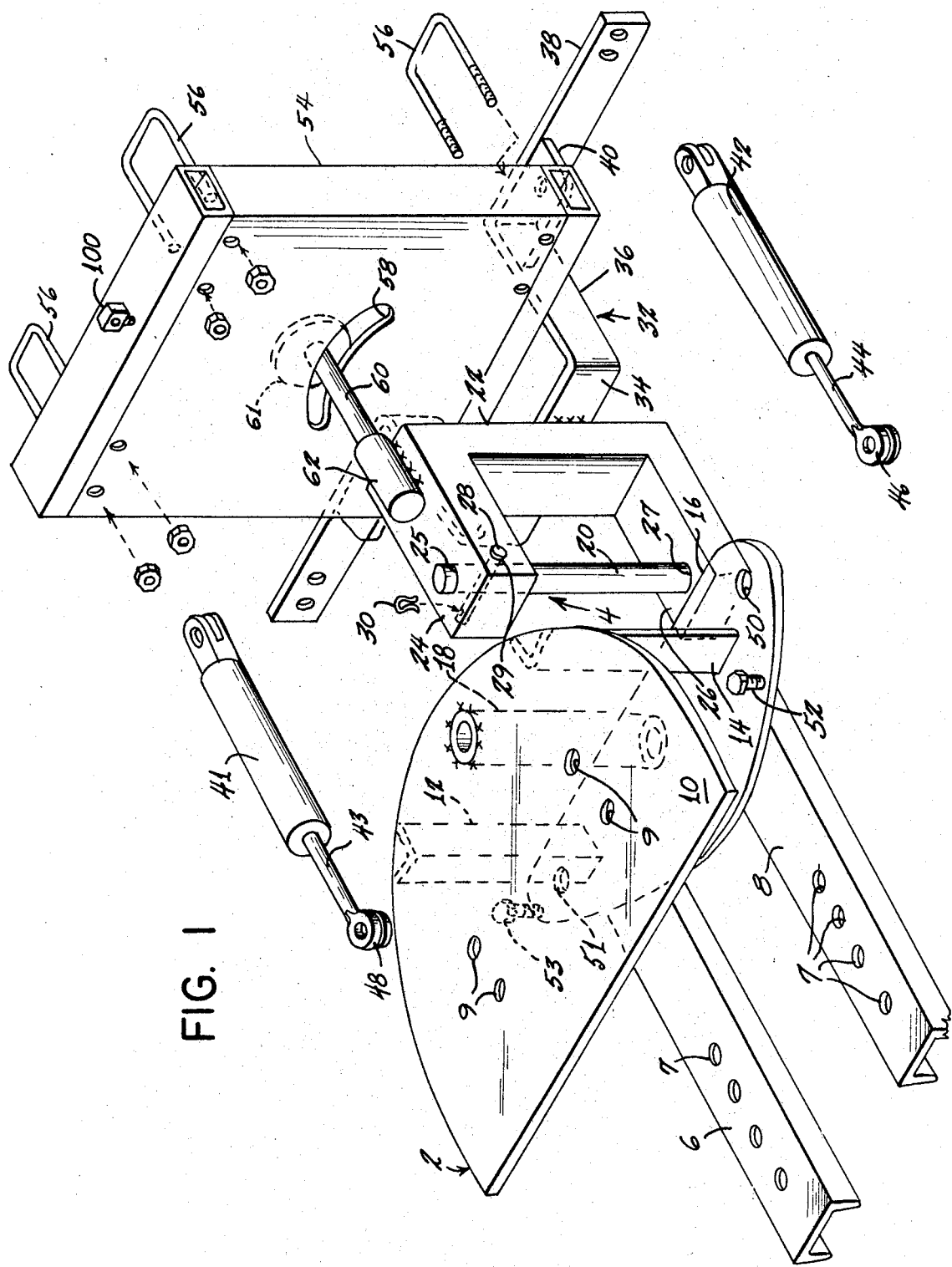
FIG. 1 is an exploded, perspective view showing the tandem hitch mechanism of this invention.

With reference to FIG. 1 of the drawings, my improved hitch mechanism is comprised of two separate coupling members generally indicated by reference numerals 2 and 4. Coupling member 2 is designed to be rigidly fastened to the rear end of the front vehicle, and for that purpose is provided with forwardly extending bottom arms 6 and 8 and top plate member 10. Holes 7 and 9 in arms 6, 8 and plate 10 permit the attachment of coupling member 2 to one end of a vehicle frame by means of bolts or cap screws. Upright angle struts 12 and 14 support arcuate bottom plate 16 from top plate 10. Sleeve or bushing 18 also extends between plates 10 and 16 and is adapted to be rotatably joined to second coupling member 4 by means of pin 20. Coupling member 4 is in the form of a large, vertical yoke having an upright portion 22 and forwardly extending segments 24 and 26. Aligned holes 25 and 27 in forwardly extending segments 24 and 26 accommodate steering pin 20, which extends therethrough, as well as through aligned sleeve 18 of front coupling member 2 in order to hold the two coupling members together in pivotal relationship. Lock pin 28 is inserted through hole 29 and upper segment 24 and turning pin 20 in order to hold pin 20 in place. Pin 28 is prevented from sliding out of place by a counter key or other locking means 30 inserted through one end thereof.

The hitch mechanism also must include some means for providing relative vertical movement of the two vehicle frames about a horizontal axis as the vehicles travel over uneven ground. For this purpose, coupling member 4 incorporates an attachment frame 32 which is adapted to be pivotally supported on one end of one of the vehicles to be coupled together. Frame 32 is comprised of cross member 34 which is welded or otherwise secured to the lower back face of vertical portion 22 of coupling member 4, and rearwardly extending legs 36 having attachment feet 38 at their outer ends. Horizontal braces 40 fastened as by welding between legs 36 and feet 38 of frame member 32 support hydraulic turning cylinders 41 and 42. Reciprocal piston rods 43 and 44 may be extended and retracted within cylinders 41 and 42, which are preferably of a double-acting type. Bifurcated ends 46 and 48 of hydraulic pistons 43 and 44 are secured to mounting holes 50 and 51 on the opposite sides of bottom plate 16 of coupling member 2 by means of pins 52 and 53.

The hitch assembly also includes a rigid support element in the form of upright plate 54 which is provided with U-bolts 56 for firmly attaching it to one end of one of the vehicle frames. Arcuate slot 58 in plates 54 shiftably engages and supports a horizontally extending shift pin 60 which is rigidly attached to coupling member 4 as by a collar 62 welded to the top face of horizontally extending segment 24.

Figure 2:
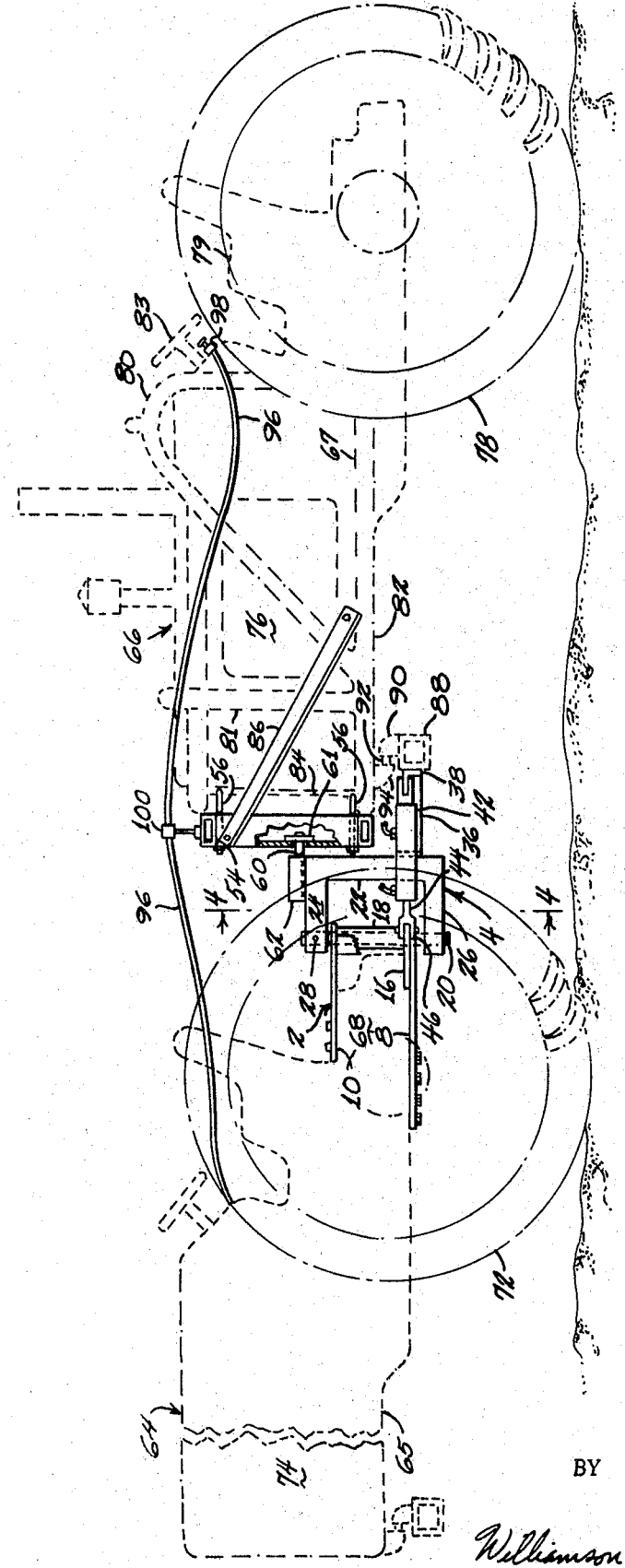
FIG. 2 is a side elevation view showing two tractors connected in tandem by the hitch mechanism of this invention.
Figure 3:
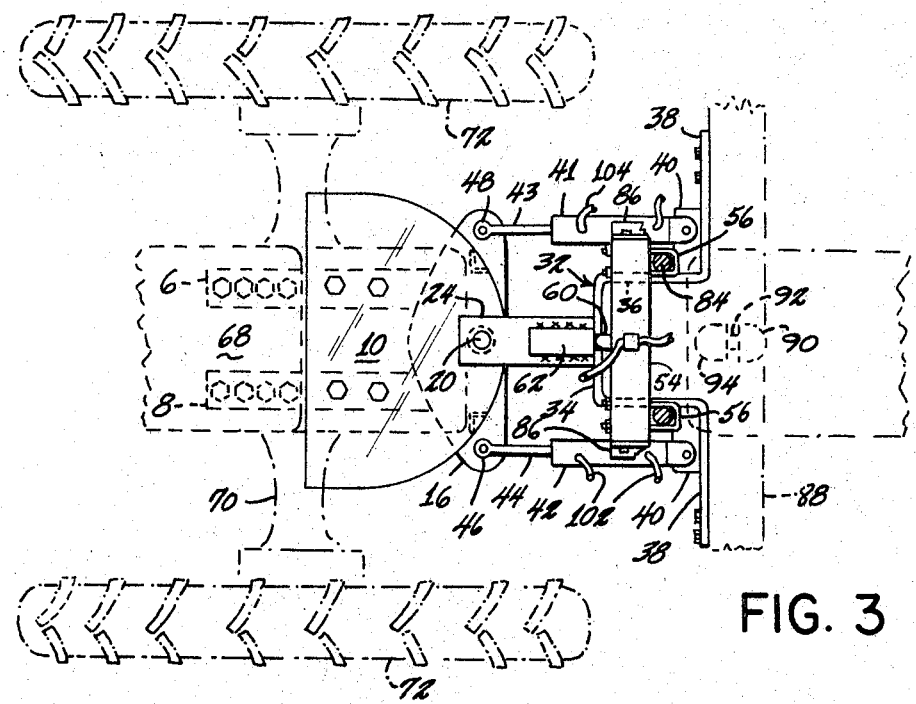
FIG. 3 is a top, plan view of the tandem hitch arrangement of FIG. 2.
Figure 4:
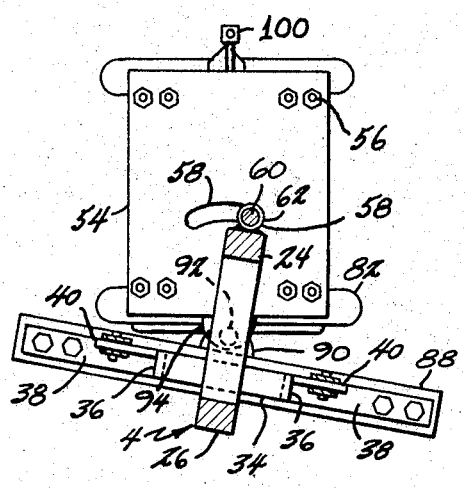
FIG. 4 is a vertical section view taken along lines 4—4 of FIG. 2 showing the vertically, swingable portion of the hitch mechanism.

The manner in which the hitch mechanism is secured to two vehicle frames so as to permit the vertical, swinging movement of coupling member 4 may be best understood by reference to FIGS. 2 through 4. For purposes of illustration, I have shown my improved coupling mechanism in the preferred tandem hitch arrangement with respect to two rubber-tired tractors 64 and 66. Rigid coupling member 2 and vertically swingable coupling member 4 could be attached to adjacent ends of either of the frames 65 and 67 of the two tractors. For purposes of convenience as will appear hereinafter, the hitch mechanism has been designed so as to permit rigid coupling member 2 to be fastened to the rear end of front tractor 64 and swingable coupling member 4 to be pivotally secured to the forward end of rear tractor 66. The rigid attachment of front coupling member 2 to front tractor 64 is accomplished by bolting top plate 10 and forward extending arms 6 and 8 to the top and bottom sides of differential housing 68 in the manner indicated in FIGS. 2 and 3. The positioning of arms 6 and 8 on opposite sides of differential housing 68 permits them to exert turning torque on rear axle 70 which supports ground engaging, rubber-tired wheels 72 on its opposite ends. Tractor 64 carries its own power plant in the form of an engine generally indicated by reference numeral 74 which is drivingly connected to rear wheels 72 through differential 68 and rear axle 70.

Rear tractor 68 also has its own engine 76 which is drivingly connected to rear, ground engaging wheels 78. Rigid, upright plate 54 of the hitch mechanism is mounted on the front end of rear tractor 66 by any suitable fastening means. If the rear tractor is provided with a bar-type front end loader frame as indicated by reference numerals 80, 81, and 82, vertical plate 54 may be conveniently installed by utilizing U-bolts 56 to fasten it to upright end loader frame member 84. Angle iron cross braces 86 fastened to the opposite sides of rear vehicle frame 67 serve to rigidify vertical plate 54. Rear coupling member 4 is mounted for pivotal movement about a horizontal axis by extending shift pin 60 through arcuate slot 58 in plate 54 and securing it thereto by means of collar 61; and by securing upright portion 22 thereof to pivotal support means on the front end of rear tractor 66. Although any type of pin and socket joint could be provided on a front end of rear tractor frame 67 to pivotally support coupling member 4, I have found it convenient to utilize pivotally mounted front axle 88 of tractor 66 for this purpose. Axle 88 is supported for vertical, swinging movement about horizontal pivot pin 92 extending from socket 94 on the bottom of rear tractor frame 67. Mating socket 90 on axle 88 is rotatably attached to pivot pin 92. In order to insure the free swinging movement of axle 88 in response to the vertical tipping action of front tractor frame 65 the front wheels have been removed from the opposite ends thereof. Rear coupling member 4 is secured to axle 88 for vertical, pivotal movement therewith by bolting outwardly extending feet 38 of frame 32 to the opposite sides of axle 88 as is best indicated in FIG. 3.

The installation of the hitch mechanism is completed by attaching the rear ends of supplemental, hydraulic turning cylinders 41 and 42 to horizontal braces 40 of rearwardly extending frame assembly 32. After coupling members 2 and 4 are fastened together by means of vertically extending steering pin 20, bifurcated end portions 46 and 48 of hydraulically actuated pistons 43 and 44 are connected to the outer ends of bottom plate 16 by means fo pins 52 and 53 inserted through mounting holes 50 and 51.

With tractors 64 and 66 connected together by means of coupling members 2 and 4 in the arrangement shown in FIGS. 2 and 3, the pulling power of both tractor engines 74 and 76 acting through the four-wheel drive combination of both sets of wheels 72 and 78 may be utilized to pull a relatively large and heavy ground-working apparatus. I prefer to drive the tandem coupled tractors from seat 79 of rear tractor 66. A connecting member such as bowden wire 96 is fastened to the throttle lever 98 of rear tractor 66 and extends through guide ring 100 mounted on the top of rigid plate 54 to a point of connection with the throttle in front tractor 64. In this way, the speed and power output of engines 74 and 76 can be coordinated so that wheels 72 and 78 will turn at the same speed. Hydraulic fluid lines 102 and 104 of hydraulic steering cylinders 41 and 42 are connected to the power steering system of rear tractor 66 so as to be actuable by the turning of rear steering wheel 83. Vertically extending pin 20 acts as a central kingpin about which the entire rear end, including wheels 72 and axle 70 of front tractor 64 pivots horizontally in response to the oppositely directed force of power pistons 43 and 44 as steering wheel 83 is turned. As front tractor wheels 72 tip up and down during the movement of the tractors over uneven terrain, the vertical swinging movement of front tractor frame 75 and rear axle 70 is transmitted through rigid coupling member 2 to rear coupling member 4 which swings back and forth in a vertical plane with axle 88 about a horizontal axis extending through pivot pin 92. Rear coupling member 4, and front tractor frame 65 connected thereto are supported during such oscillating movement by shift pin 60 which is supportably engaged by arcuate slot 58 as it oscillates back and forth therein in the manner indicated in FIG. 4. It is to be noted that the center of arcuate slot 58 is in horizontal alignment with pivot pin 92 so that the side walls of slot 58 will continuously engage shift pin 60 as upright portion 22 of coupling member 4 swings in a vertical plane. The vertical oscillation of front tractor frame 65 and coupling member 4 with respect to upright plate 54 and rear tractor frame 67 is indicated in FIG. 4. In like manner, when rear tractor wheels 78 travel over uneven ground, rear frame 67 will pivot about a horizontal axis and relative movement between the two tractor frames will be permitted by the sliding movement of arcuate slot 58 over shift pin 60. The hitch mechanism of this invention thus permits articulating movement of the two vehicle frames in both a horizontal direction about central kingpin 20 and in a vertical direction about a horizontal axis extending through pivot pin 92.

On the basis of the foregoing description, it will be readily apparent that my improved tractor hitch is so designed so as to permit the relatively quick and easy coupling of two tractors in tandem without any substantial modification to either of the vehicles. After securing coupling members 2 and 4 to the rear and front ends of the two vehicles, it is only necessary to position the two vehicles in proper tandem alignment and then drop king bolt 20 in place through holes 25, 27 in aligned sleeve 18. The front wheels of both tractors are then removed, and the two vehicles are ready for operation as a combined, four-wheel drive unit. Two, fifty horsepower tractors connected together in tandem by means of the hitch mechanism of this invention can pull the same amount of tilling or ground-working equipment which normally requires a one hundred horsepower tractor. A farmer owning one of my tandem hitches may thus avoid the necessity of buying a large, expensive tractor for pulling heavy machinery such as a large number of plow bottoms. By investing in two or more small tractors, the farmer can use the more versatile, small tractors separately for a variety of purposes, and then couple them together in tandem by means of my hitch mechanism in order to avail himself of their combined power for pulling large machinery.

The particular embodiments of my invention which I have shown and described are intended to be illustrative only. Various elements of the hitch mechanism could be changed or modified without altering or interfering with the basic operational features. For example, structural means other than the combination of plate 10 and forwardly extending arms 6 and 8 could be utilized to firmly attach one coupling member to the rear of a front vehicle.

What I claim is:

1. In combination with a pair of tractor vehicles comprising a first, forward vehicle frame having driven, ground engaging wheels and a power source drivingly connected thereto, and a second, rear vehicle frame having driven, ground engaging wheels and a power source drivingly connected thereto, an articulating tandem hitch mechanism comprising:
   a first coupling member rigidly secured to one end of one of said vehicle frames;
   a second coupling member releasably joined to said first coupling member; and
   mounting means on the adjacent end of the other one of said vehicle frames pivotally supporting said second coupling member for vertical swinging movement about a substantially horizontal axis extending lengthwise of said vehicle frames, said mounting means comprising a pivot bar in the form of the wheel supporting axle normally provided at the front end of said rear vehicle frame, the front wheels being removed from said axle for purposes of the articulating tandem connection of the vehicles, and said pivot bar axle being mounted for vertical, swinging movement about said substantially horizontal axis; and
   means connecting said second coupling member to said pivot bar axle for pivotal movement therewith about said horizontal axis.

2. The tandem hitch arrangement defined in claim 1, and further including:
   a substantially horizontal support shaft mounted on said second coupling member;
   an upright, rigid support element fastened to said adjacent end of said other one of said vehicle frames; and
   an arcuate slot in said rigid support element in which said support shaft its shiftably received.

3. In combination with a pair of tractor vehicles comprising a first, forward vehicle frame having driven, ground engaging wheels mounted on the opposite ends of an axle and a power source drivingly connected thereto, and a second, rear vehicle frame having driven, ground engaging wheels mounted on the opposite ends of an axle and a power source drivingly connected thereto, an articulating tandem hitch mechanism comprising:
   a first coupling member rigidly secured to one end of one of said vehicle frames;
   a second coupling member releasably joined to said first coupling member, said first and second coupling members being pivotal relative to each other about a vertical axis defined by a pivot pin extending vertically through aligned openings therein;
   mounting means on the adjacent end of the other one of said vehicle frames pivotally supporting said second coupling member for vertical swinging movement about a substantially horizontal axis extending lengthwise of said vehicle frames;
   a pair of rigid arms extending forwardly from said first coupling member and firmly secured to the opposite sides of said axle of said first, forward vehicle frame; and
   a pair of hydraulic turning cylinders having reciprocally actuable piston rods connected to opposite sides of said first coupling member, said hydraulic cylinders being secured to the front end of said rear vehicle frame and being connected to a hydraulic system on one of said tractors for actuation thereby, whereby said front vehicle frame and said wheels mounted thereon may be turned horizontally about said vertical pin for steering purposes by the oppositely directed action of said hydraulic cylinder piston rods.

4. In combination with a pair of vehicles comprising a first, forward vehicle frame having driven, ground engaging means and a power source drivingly connected thereto, and a second, rear vehicle frame having driven, ground engaging means and a power source drivingly connected thereto, an articulating tandem hitch mechanism comprising:
   a first coupling member rigidly secured to one end of one of said vehicle frames;
   a second, upright coupling member releasably joined to said first coupling member, said coupling members being pivotal relative to each other about a vertical axis defined by a pivot pin extending vertically therethrough;
   mounting means on the adjacnet end of the other one of said vehicle frames pivotally supporting said second coupling member for vertical swinging movement about a substantially horizontal axis extending lengthwise of said vehicle frame;
   a substantially horizontal support shaft mounted on the upper end of said second coupling member;
   an upright, rigid support element fastened to said adjacent end of said other one of said vehicle frames;
   an arcuate slot in said rigid support element in which said support shaft is shiftably received, said arcuate slot supportably engaging said support shaft for swinging movement therein; and
   means securing the lower end of said second coupling member to said mounting means on the adjacent end of the other one of said vehicle frames for pivotal support hereby about said substantially horizontal axis.

References Cited

UNITED STATES PATENTS

| | | | |
|---|---|---|---|
| 2,173,068 | 9/1939 | Schroeder | 280—111 X |
| 3,061,029 | 10/1962 | Pryor. | |
| 3,119,630 | 1/1964 | Oliver. | |
| 3,302,742 | 2/1967 | Sunderlin. | |

LEO FRIAGLIA, Primary Examiner

J. A. PEKAR, Assistant Examiner

U.S. Cl. X.R.

280—402, 492